United States Patent
Benz et al.

(10) Patent No.: US 9,933,186 B2
(45) Date of Patent: Apr. 3, 2018

(54) ABSORBER TUBE

(71) Applicant: SCHOTT SOLAR AG, Mainz (DE)

(72) Inventors: Nikolaus Benz, Mainz (DE); Thomas Kuckelkorn, Jena (DE)

(73) Assignee: SCHOTT SOLAR AG, Mainz (DE)

(*) Notice: Subject to any disclaimer, the term of this patent is extended or adjusted under 35 U.S.C. 154(b) by 511 days.

(21) Appl. No.: 14/622,622

(22) Filed: Feb. 13, 2015

(65) Prior Publication Data

US 2015/0168016 A1    Jun. 18, 2015

Related U.S. Application Data

(63) Continuation of application No. PCT/EP2013/066553, filed on Aug. 7, 2013.

(51) Int. Cl.
| | | |
|---|---|---|
| *F24J 2/04* | (2006.01) | |
| *F24J 2/05* | (2006.01) | |
| *F24J 2/07* | (2006.01) | |
| *F24J 2/46* | (2006.01) | |

(52) U.S. Cl.
CPC ............. *F24J 2/04* (2013.01); *F24J 2/055* (2013.01); *F24J 2/07* (2013.01); *F24J 2/4636* (2013.01); *Y02E 10/41* (2013.01); *Y02E 10/44* (2013.01)

(58) Field of Classification Search
CPC .... F24J 2/055; F24J 2/04; F24J 2/4636; F24J 2/07; Y02E 10/44; Y02E 10/41
See application file for complete search history.

(56) References Cited

U.S. PATENT DOCUMENTS

| 6,705,311 | B1 | 3/2004 | Schwartzman et al. | |
|---|---|---|---|---|
| 7,013,887 | B2* | 3/2006 | Kuckelkorn | F24J 2/055 126/652 |
| 7,552,726 | B2* | 6/2009 | Kuckelkorn | F24J 2/055 126/651 |

(Continued)

FOREIGN PATENT DOCUMENTS

| CN | 1495394 | 5/2004 |
|---|---|---|
| CN | 1608189 | 4/2005 |

(Continued)

OTHER PUBLICATIONS

English translation of the International Search Report dated Apr. 2, 2014 for corresponding PCT/EP2013/066553, 2 pages.

(Continued)

*Primary Examiner* — Alfred Basichas
(74) *Attorney, Agent, or Firm* — Ohlandt, Greeley, Ruggiero & Perle, L.L.P.

(57) ABSTRACT

An absorber tube is provided that has a central metal tube, a glass cladding tube, and a glass-metal transition element. The metal tube and the glass-metal transition element are connected to each other by an expansion compensation device such that they can be displaced relative to each other in the longitudinal direction. The expansion compensation device is arranged at least partially in an annular space between the metal tube and the glass-metal transition element. In the annular space, at least one shielding device is arranged, which has a first annular disc-shaped segment arranged at an axial distance in front of the end face and covers at least the connection region of the attachment element and the inner end of the expansion compensation device.

18 Claims, 6 Drawing Sheets

(56) References Cited

U.S. PATENT DOCUMENTS

| | | |
|---|---|---|
| 2004/0050381 A1 | 3/2004 | Kuckelkorn et al. |
| 2012/0186576 A1 | 7/2012 | Kuckelkorn et al. |
| 2013/0228166 A1 | 9/2013 | Kuckelkorn |

FOREIGN PATENT DOCUMENTS

| | | |
|---|---|---|
| CN | 101893340 | 11/2010 |
| CN | 102519160 | 6/2012 |
| CN | 102563930 | 7/2012 |
| CN | 102575873 A | 7/2012 |
| DE | 10231467 A1 | 2/2004 |
| DE | 60223711 T2 | 10/2008 |
| DE | 102009045100 A1 | 4/2011 |
| DE | 102009047548 A1 | 6/2011 |
| JP | S58168846 A | 10/1983 |
| WO | 2011067289 | 6/2011 |

OTHER PUBLICATIONS

English translation of the Written Opinion of the International Searching Authority dated Apr. 2, 2014 for corresponding PCT/EP2013/066553, 5 pages.

English translation of the International Preliminary Report on Patentability dated Feb. 17, 2015 for corresponding PCT/EP2013/066553, 6 pages.

* cited by examiner

ABSORBER TUBE

CROSS REFERENCE TO RELATED APPLICATIONS

This application is a continuation of International Application No. PCT/EP2013/066553 filed Aug. 7, 2013, which claims benefit under 35 U.S.C. § 119(a) of German Patent Application No. 10 2012 214 412.9 filed Aug. 14, 2014, the entire contents of all of which are incorporated herein by reference.

BACKGROUND

1. Field of the Disclosure

The present disclosure is related to absorber tubes. More particularly, the present disclosure is related to absorber tubes having a central metal tube and a glass cladding tube, which surrounds the central metal tube.

2. Description of Related Art

DE 10 231 467 B4 describes such an absorber tube, which, in particular, is employed for parabolic trough collectors in solar technology power plants. The absorber tube comprises a central metal tube and a glass cladding tube surrounding the central metal tube. The glass tube is provided with a glass-metal transition element at both ends, at each of which an expansion compensation device or an attachment element engages. The expansion compensation device is at least partially arranged in the annular space between the metal tube and the glass transition element.

The attachment element can extend between the expansion compensation device and the metal tube in the annular space, as a result of which, low-angle incident radiation as well as emitted radiation of the metal tube are reflected back onto the metal tube in the case of a conical configuration of the attachment element.

The attachment element can also extend between the expansion compensation device and the glass tube in the annular space and, in this case, it is joined to the glass-metal transition element. The attachment element has a fastening element in the form of an annular disc, with which the attachment element is fastened to the expansion compensation device, which can include a bellows.

Known from DE 60 223 711 T2 is an absorber tube in which the glass-metal transition element and the expansion compensation device in the form of a bellows are arranged one behind the other in the axial direction. Provided on the outer side are a first shielding element, which shields the bellows, and a second shielding element, which shields the glass-metal transition element against incident radiation. Moreover, an internal radiation shield is arranged between the cladding tube and the metal tube in the region of the glass-metal transition element in the annular space. The internal radiation shield is suspended by retaining arms in the bellows.

A drawback of this arrangement with a bellows having a glass-metal transition element is the relative long length of the structure, which leads to a reduction in the free aperture and thus of the efficiency.

The glass-metal transition element is initially shielded from the outside against direct irradiation by one of the two outer shielding elements. The inner radiation shield, which has an L-shaped cross section, has only support arms in the region of the glass-metal transition element, so that low-angle incident radiation and radiation reflected from the metal tube can impinge in the region between the support arms on the glass-metal transition element. Only a part of this radiation is intercepted by the inner radiation shield.

This design has the further drawback that it itself absorbs radiation and, as a result, is heated. The inner radiation shield is thermally coupled only insufficiently to the bellows via the support arms, so that the portion of the radiation that is absorbed by the annular component has to be emitted again in large part by radiation. A substantial portion of the radiated heat impinges in turn on the glass-metal transition element. As a result of this, the glass-metal transition element undergoes a secondary input of heat due to radiation emitted by the heated radiation shield.

Both DE 10231467 B4 and DE 60223711 T2 disclose an outer-lying protection of the glass-metal transition and the expansion compensation device. This outer-lying protection is nowadays generally mounted in the power plant after installation of the receiver. To this end, sheet-metal reflectors are mounted after welding together the receiver in the field.

A drawback of this is that the glass-metal transition is unprotected during transport and installation and, as a result, can readily be damaged. During the mounting process, scratches can occur in the cladding tube, with scratches in the vicinity of the glass-metal transition element being especially critical and possibly leading to weakening of the absorber tube and later glass fracture during operation.

SUMMARY

The object of the invention is to provide an absorber tube with an increased lifetime.

It is provided that, at one end of the absorber tube, at least one shielding device is arranged in the annular space, said shielding device comprising a first annual disc-shaped segment, which is arranged at an axial distance in front of the end face and covers at least the connection region of the attachment element and the inner end of the expansion compensation device.

The first annular disc-shaped segment has the advantage that it protects not only the connection region of the expansion compensation device and the attachment element, but also the glass-metal transition element, against radiation reflected by the metal tube.

It has been found that the glass-metal transition element and the expansion compensation device represent critical components in regard to the service life of the absorber tube.

The radiation reflected by the metal tube or the emitted radiation are indeed kept away from the glass-metal transition element in part by the expansion compensation device, because the expansion compensation device is arranged beneath the glass-metal transition element; however, this is associated with the drawback that the radiation then impinges on the expansion compensation device and, over time, the material of the expansion compensation device, in particular also the region where the expansion compensation device is joined to the attachment element, is damaged. Under certain circumstances, leakage at the points of contact can occur there, so that the required vacuum in the annular space is then lost or else the inert gas filling the annular space is contaminated by infiltration of air. This damage is prevented by means of the shielding device. It has been found that, owing to the first annular disc-shaped segment in the shielding device in the annular space of the absorber tube, the service life of the absorber tube can be increased effectively.

The amount of radiation to be screened can be directly adjusted through the size of the surface area of the first annular disc-shaped segment.

Preferably, the first annular disc-shaped segment covers at least 50% of the front face, particular preferably the entire front face.

The radiation energy that impinges on the first annular disc-shaped segment leads to heating of the first annular disc-shaped segment and is distributed through thermal conduction over the area of the shielding device, as a result of which the temperature level is lowered. Owing to the preferably smooth surface, most of the radiation is reflected directly outward or toward the metal tube, whereas, in the prior art, a larger portion of the radiation is absorbed in the folds of the bellows. The absorbed part of the radiation is distributed through thermal conduction in the entire shielding device, whereby a uniform temperature level is achieved over the entire shielding device. Preferably, the shielding device is attached to a metallic component of the absorber tube—with the exception of the metal tube—so that the heat can also be dissipated. This will be explained in detail below.

The first annular disc-shaped segment can be arranged perpendicular to the longitudinal axis L. However, it is especially preferred that the first annular disc-shaped segment is arranged obliquely at an angle $\alpha \geq 0$ with respect to a vertical S on the longitudinal axis L of the absorber tube. The first annular disc-shaped segment is preferably arranged obliquely such that a radially outer-lying edge protrudes axially further into the annular space than does a radially inner-lying edge of the first annular disc-shaped segment.

This embodiment has the advantage that a large part of the obliquely incident rays do not strike the shielding apparatus, where they would lead in part to heating that cannot be utilized, but rather impinge directly on the metal tube and are converted there into heat that can be utilized. The tilt of the first annular disc-shaped segment enlarges the effective area of the absorber tube in comparison to a front surface segment that is not tilted.

Preferably, the angle $\alpha$ lies in the range of 0°-30°. This range is preferred, because, on an annual average for conventional installation sites of solar thermal parabolic trough power plants, the insolation impinges especially often at an angle of approximately 20°.

For an angle >30°, the radially outer-lying edge of the shielding device would be displaced axially toward the center of the tube and, as a result, cover a part of the metal tube, whereby the effective length of the metal tube, in particular in the case of nearly perpendicular irradiation, would be reduced.

The shielding device extends at least partially into the annular space segment between the glass-metal transition element and the attachment element. As a result of this, the heat of the first annular disc-shaped segment is better distributed and conducted into the cooler region of the annular space segment.

It is therefore preferred that the first annular disc-shaped segment transitions at its radially outer-lying edge into a first tubular segment, which extends into the annular space segment. The tubular segment preferably has a cylindrical or conical construction.

The conical construction has the advantage that it is possible to create a good contact with the tubular segment of the attachment element for the purpose of thermal conduction, without the necessity of highly precise fabrication tolerances for the attachment element and the tubular segment of the shielding device.

The shielding device preferably has a second annular disc-shaped segment. This second annular segment adjoins the first tubular segment and also contributes to better heat distribution.

The second annular disc-shaped segment preferably lies at the glass-metal transition element or at an annular disc segment of the attachment element. This has the advantage that the shielding device can be fixed in place by means of the second annular disc-shaped segment. It is also possible via this second annular segment to conduct heat away from the glass-metal transition element or from the attachment element and thus dissipate it into the surroundings of the absorber tube.

Preferably, the glass-metal transition element has an annular step against which the second disc-shaped segment of the shielding device is supported.

The second annular disc-shaped segment extends radially outward in the annular space formed between the expansion compensation device and the glass-metal transition element and can, in accordance with one embodiment, are supported at the glass-metal transition element. As a result, a separate annular chamber is created between the second annular disc-shaped segment and an outwardly arranged annular disc segment of the attachment element and this chamber can serve to accommodate getter material.

Another embodiment provides that the second annular disc-shaped segment of the shielding device rests against the annular disc segment of the attachment element. This embodiment has the advantage that the heat of the shielding device can be dissipated to the outside via the annular disc segment of the attachment element. Depending on the choice of embodiment in each case, the second tubular segment of the shielding device is constructed to be longer or shorter.

The annular step of the glass-metal transition element also leads to an enlargement of the diameter of the glass-metal transition element in the direction of the tube end. The annular space between the second annular disc-shaped segment and the annular disc segment of the attachment element is thereby enlarged, so that more space is provided for accommodating getter material. Moreover, the annular step prevents any axial displacement of the shielding element away from the front face of the expansion compensation device.

Preferably, the first tubular segment of the shielding device is arranged at a distance from the attachment element. In particular, the first tubular segment is arranged at a distance from the tubular segment of the attachment element. In this way, the annular space segment between the glass-metal transition element and the attachment element is reduced. The surface area of the first annular disc-shaped segment of the shielding device can thereby be enlarged, so that less radiation can reach the glass-metal transition element from below.

Preferably, the first tubular segment contacts the attachment element, preferably the tubular segment of the attachment element. This form-fitting contact has the advantage that the heat of the shielding device can be better dissipated.

Preferably, a getter is arranged in the annular space segment. A getter is composed of a material that is capable of bonding chemically or physically to residual gases in a largely evacuated space. As a result, the vacuum required for thermal insulation of the receiver in the annular space between the metal tube and the cladding tube is sustained over a long period of operation.

The introduction of the getter in the annular space has the advantage that an additional holding device for accommodating the getter is dispensed with. The getter is preferably held by the annular disc segment of the attachment element, on the one hand, and by the second annular disc-shaped segment of the shielding element.

Preferably, the first annular disc-shaped segment extends up to an annular space segment between the expansion compensation device and the metal tube. As a result, it is ensured that absolutely no thermal emission from the metal tube can impinge on the front face of the expansion compensation device.

Preferably, the shielding device has a second tubular segment, which extends into this annular space segment. This segment has the advantage that the bellows is protected against emitted radiation from the metal tube. This second tubular segment also has the advantage that the losses at the tube end can be minimized by the shielding, because the emitted radiation of the metal tube is reflected back.

Preferably, the shielding device has openings. These openings, which can be holes or slits, are preferably arranged in the second annular disc-shaped segment and/or in the first tubular segment of the shielding device. In order for any gases that have diffused into the annular space, in particular hydrogen, to be able to be bound by the getter, it is of advantage when gas exchange can take place through these openings.

The shielding device is preferably a ring-shaped element. The element is preferably constructed as a closed ring. The ring-shaped element has the advantage that it is possible to choose any position of installation in regard to rotation around the longitudinal axis of the absorber tube.

Preferably, an outer protective cap is provided on the outer side of the cladding tube, said protective cap covering at least the glass transition element. Due to the permanently mounted outer protective cap, the glass-metal transition element is already protected against mechanical damage during the final steps of fabrication of the absorber tube, during transport, and during the assembly process in the power plant. Furthermore, the outer protective cap protects the glass-metal transition element against radiation that comes from the outside from the primary mirror. In addition, heat is conducted away from the glass-metal transition element, conveyed outward, and dissipated into the surrounding air by convection.

BRIEF DESCRIPTION OF THE DRAWINGS

Exemplary embodiments will be explained in detail below on the basis of the drawings.

Shown are:

FIG. 2a is an enlarged illustration of the detail X from FIG. 1a,

DETAILED DESCRIPTION

Figure 1A:
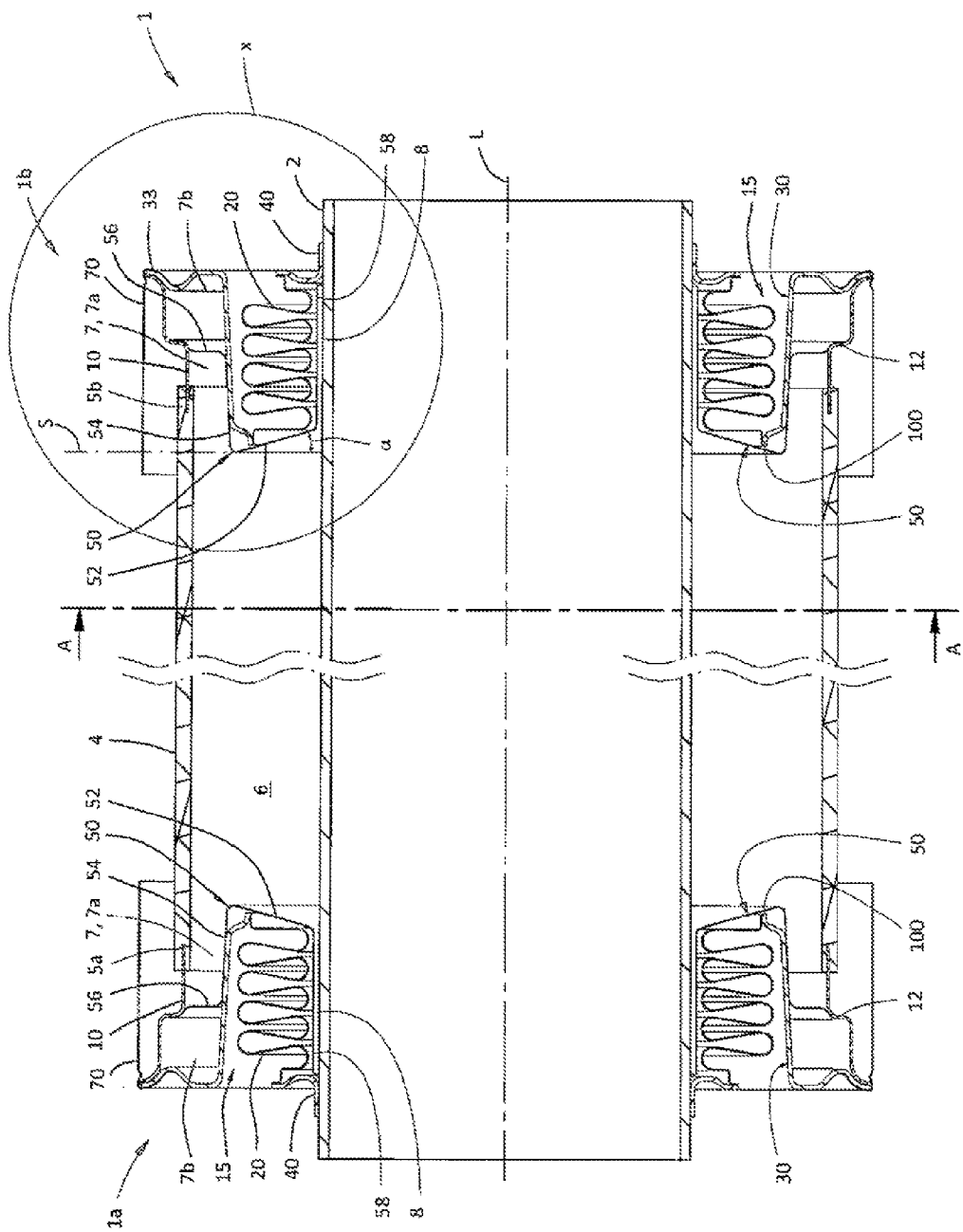
FIG. 1a is a longitudinal section through an absorber tube.

Illustrated in Figure 1a is an absorber tube 1 with a longitudinal axis L, which has a metal tube 2, through which a heat exchanger fluid flows. Arranged coaxially to the metal tube 2 is a glass cladding tube 4, which is connected to the metal tube 2 at both ends via, in each case, a glass-metal transition element 10, an attachment element 30, and an expansion compensation device 20 in the form of a bellows and a fastening element 40. In this arrangement, the bellows is situated beneath the attachment element 30 and delimits, together with the attachment element 30, an outwardly open outer annular space 15. Formed between the glass cladding tube 4 and the metal tube 2 is an inner annular space 6, which is evacuated or filled with an inert gas.

At the ends 1a,b of the absorber tube 1, the annular space 6 transitions into the two annular space segments 7 and 8. The annular space segment 7 is formed largely between the glass-metal transition element 10 and the attachment element 30. The annular space segment 8 is situated between the metal tube 2 and the expansion compensation device 20.

The metal tube 2 generally has a coating (not illustrated), which absorbs sunlight incident through the glass cladding tube 4 in as optimal a manner as possible. FIG. 1 shows an expansion compensation device 20 at both ends 1a,b of the absorber tube 1. It is also possible to furnish the absorber tube 1 with such an expansion compensation device 20 only at one end 5a or 5b.

Figure 2A:
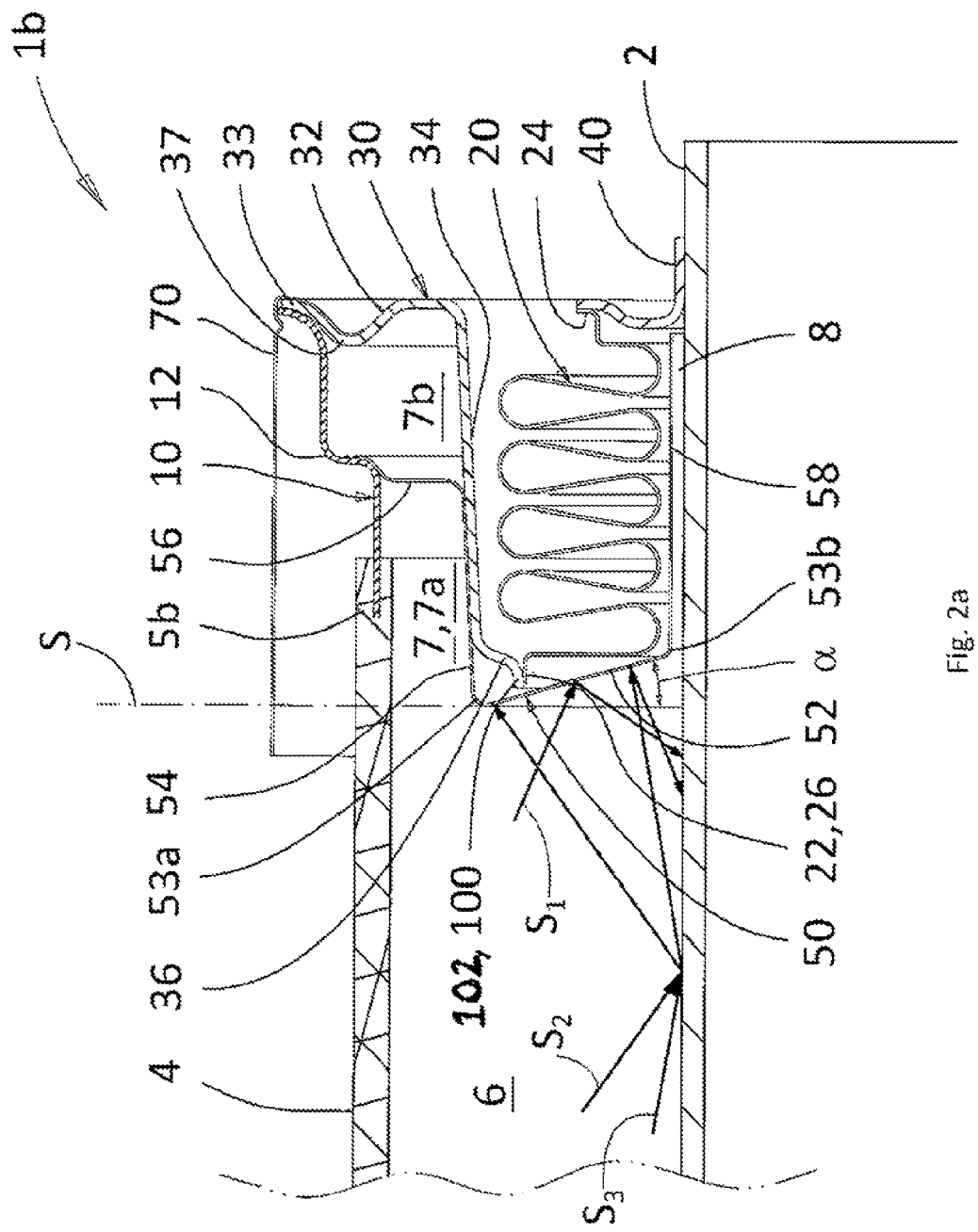

Illustrated in FIG. 1a is a first embodiment of a shielding device 50, which is described in detail in conjunction with FIG. 2a.

Figure 1B:
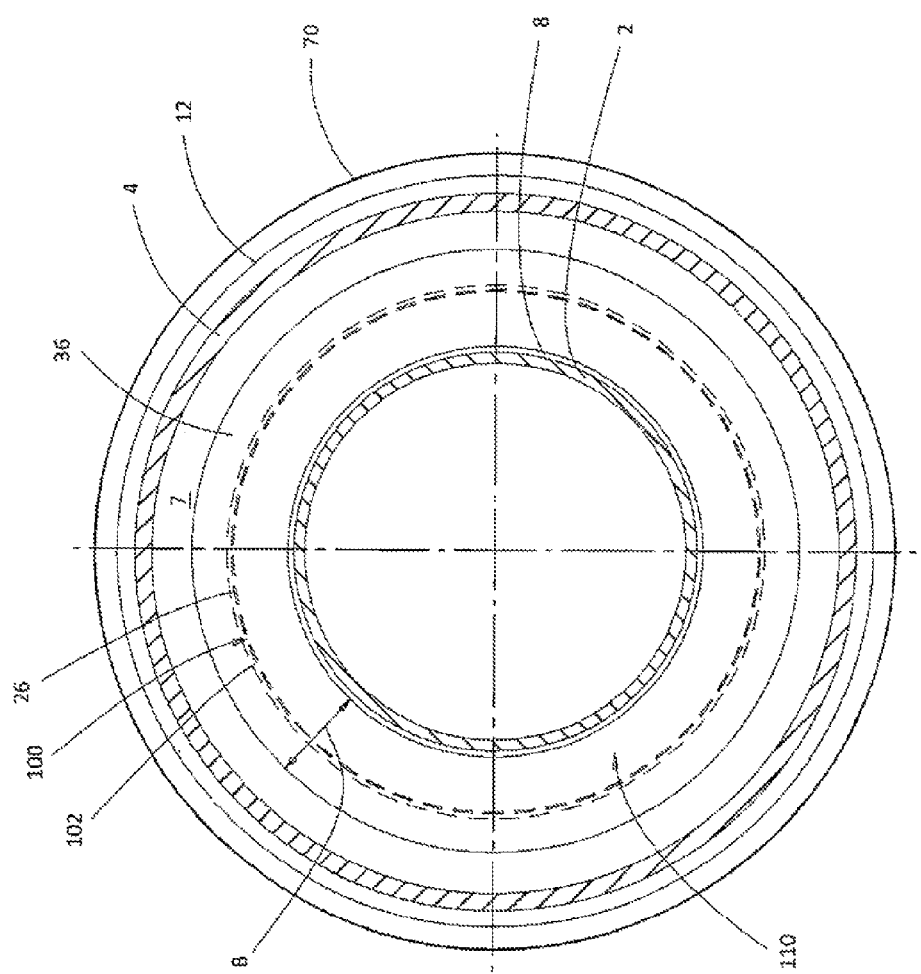
FIG. 1b is a cross section through the absorber tube along the line A-A.

A section through the absorber tube 1 along the line A-A in Figure 1a is illustrated in Figure 1b, in which the shielding device 50 and the outer protective cap 70 were omitted. The axial plan view in the direction of the tube end 1b onto the attachment element 30 and the expansion compensation device 20 defines the front face 110, which has a width B. The segment 36 of the attachment device 30 and the connection segment 26 of the expansion compensation device 20 are joined to each other at the connection point 102. The front faces of the segments 26, 36 form the connection region 100.

Illustrated in FIG. 2a is an enlarged illustration of the detail X from FIG. 1. The bellows of the expansion compensation device 20 is fastened at the outer end 24 at the fastening element 40, which, in turn, is fastened, in particular welded, at the metal tube 2. At the inner end 22, the bellows has a connection segment 26, at which the attachment element 30 is fastened by its fastening segment 36.

The attachment element 30 has a conically formed tubular segment 34, which delimits the annular space segment 7 and transitions at the tube end into an annular disc segment 32. The annular disc segment 32 has an inward directed ribbing 37 and a radially outward extending fastening segment 33. Arranged at the fastening segment 33 is the glass-metal transition element 10 as well as the outer protective cap 70, which extends over the entire glass-metal transition element up to beyond the end 5b of the glass cladding tube 4. The glass-metal transition element 10 has an annular step 12, against which the shielding device 50 is supported.

The outer protective cap 70 is preferably welded together with the glass-metal transition element 10 and the annular disc segment 32 during fabrication of the absorber tube or else permanently joined to it by means of another form-fitted, force-fitted, or firmly bonded connection. The outer protective cap serves insofar during subsequent transport as an additional protection of the glass-metal transition element region, namely the connection point between the glass cladding tube 4 and the glass-metal transition element 10.

The shielding device 50 has a first annular disc-shaped segment 52, which is arranged at a distance in front of the front face 110 and covers the connection region 100 of the fastening segment 36 of the attachment element 30 and the connection segment 26 of the bellows 20.

The connection region 100 is exposed, without a shielding device 50, both to incident radiation as well as to radiation reflected from the metal tube 2 and, as a result, is subjected to a high thermal load. When there is any leakage in the connection region 100, the reduced pressure in the annular space 6 deteriorates. Due to the shielding device 50 and, in particular, the first annular disc-shaped segment 52, the lifetime of the absorber tube 1 is markedly increased.

It can be seen in FIG. 2a that the first annular disc-shaped segment 52 is arranged tilted at an angle α of ~10° with respect to the vertical S on the longitudinal axis L of the absorber tube 1. The tilt of the first annular disc-shaped segment 52 is chosen such that the radially outer-lying edge 53a protrudes further into the annular space 6 than does the radially inner-lying edge 53b. The first annular segment 52, with a tilted construction, reflects obliquely incident radiation S1 back onto the metal tube 2. Radiation S2 and S3 impinging obliquely on the metal tube 2 is reflected onto the first annular disc-shaped segment 52, which keeps the radiation away from the connection region 100, from the bellows 20, and from the glass-metal transition element 10. The first annular disc-shaped segment 52 thus forms a conical segment of the shielding device 50. The shielding device 50 does not contact the bellows.

In the embodiment shown here, a first tubular segment 54 adjoins the outer-lying end 53a and transitions into a second annular disc-shaped segment 56.

The tubular segment 34 of the attachment element 30, like the first tubular segment 54, has a conical construction. In the embodiment illustrated here, the first tubular segment 54 lies on the conical segment 34. The heat of the first tubular segment 54 is dissipated via the attachment element 30 into the surrounding air. The segment 54 extends only partially into the annular space segment 7, with the second annular disc-shaped segment 56 adjoining and resting against an annular shoulder 12 of the glass-metal transition element 10 at about the middle of the longitudinal extension of the annular space segment 7. As a result, the annular space segment 7 is divided into the annular space segment 7a and the annular chamber 7b.

The glass-metal transition element 10 is fastened on one side to the glass cladding tube 4 and extends outward in the axial direction, where, at the other end, the glass-metal transition element 10 is joined to the attachment element 30. The annular shoulder 12 leads to an increase in diameter, whereby the annular chamber 7 is expanded, so that sufficient space for accommodating a getter 9 is created (see FIG. 2b). The getter 9 is held against displacement in the axial direction by the annular disc segment 32, which, in this case, preferably has an inward directed ribbing 37, and by the second annular segment 56 of the shielding device 50.

The first annular disc-shaped segment 52 extends radially in the direction of the metal tube 2, where, between the expansion compensation device 20 and the metal tube 2, a further annular space segment 8 is formed. The first annular disc-shaped segment 52 covers the entire front face 110. The segment 52 transitions into a second tubular segment 58, which extends in this annular space segment 18 almost up to the fastening element 40, so that the bellows is protected against reflected and emitted radiation of the metal tube 2 not only at the front face but also at its bottom side.

Figure 2B:
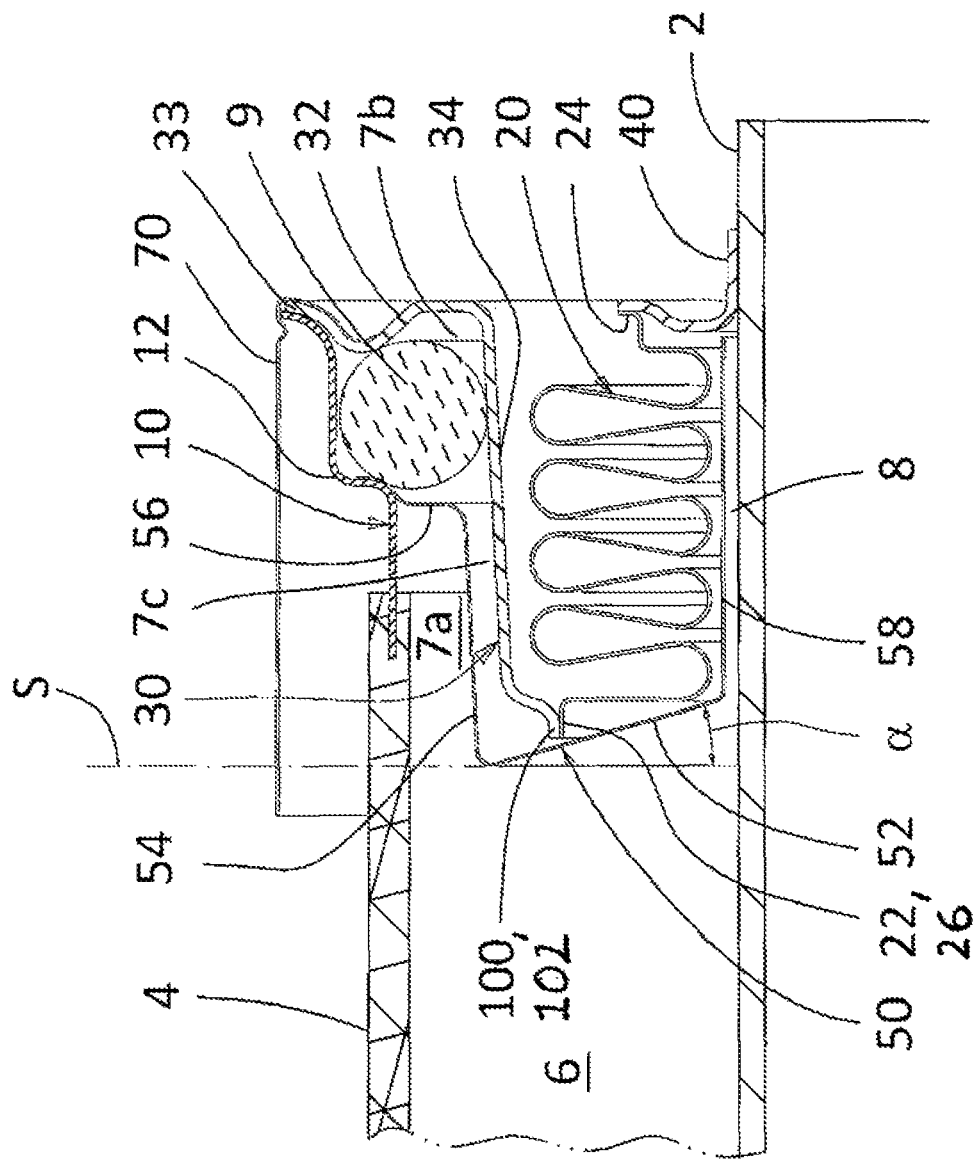
FIG. 2b is an illustration corresponding to FIG. 2a in accordance with another embodiment.

Illustrated in FIG. 2b is a second embodiment, which differs from the first embodiment in that the first tubular segment 54 does not rest on the conical segment 34 of the attachment element 30, as a result of which an annular space segment 7c is created. The surface area of the first annular disc-shaped segment 52 is thereby enlarged, so that more radiation S2 and S3 can be kept away especially from the glass-metal transition element 10.

Figure 3:
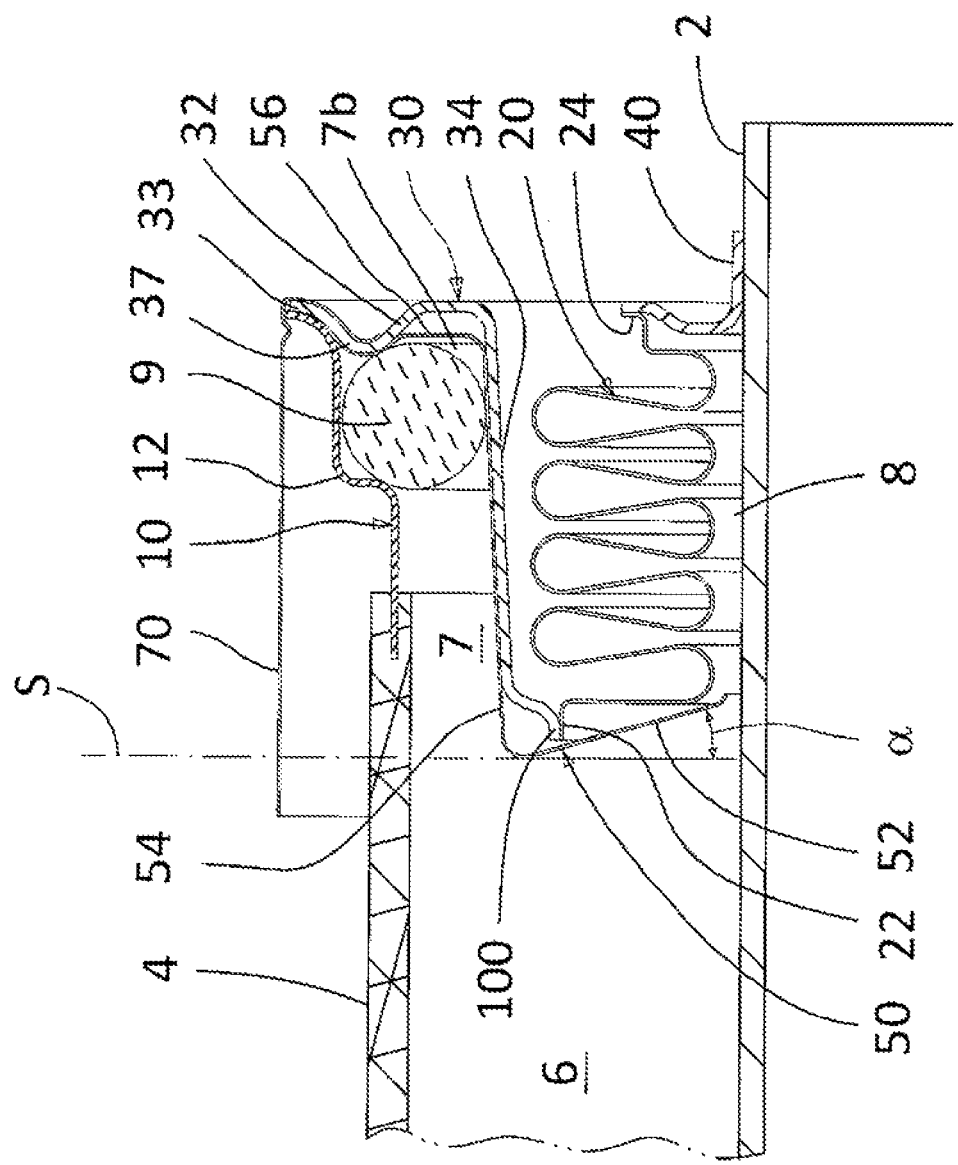
FIG. 3 is an illustration corresponding to FIG. 2a in accordance with another embodiment.

Illustrated in FIG. 3 is another embodiment, which differs from the embodiment described in FIG. 2a in that the first tubular segment 54 extends up to the annular disc segment 32 of the attachment element 30 and rests there once again in the region of the ribbing 37. In this case, the getter 9 is held by the annular disc segment 32 and the annular step 12 of the glass-metal transition element 10. In addition, this embodiment differs in that no segment 58 is provided at the shielding device 50 and that the annular space segment 7 is not subdivided. The outer protective cap 70 is drawn in from the outside over the fastening segment 33 up to the ribbing 37 and fastened in place there.

Figure 4:
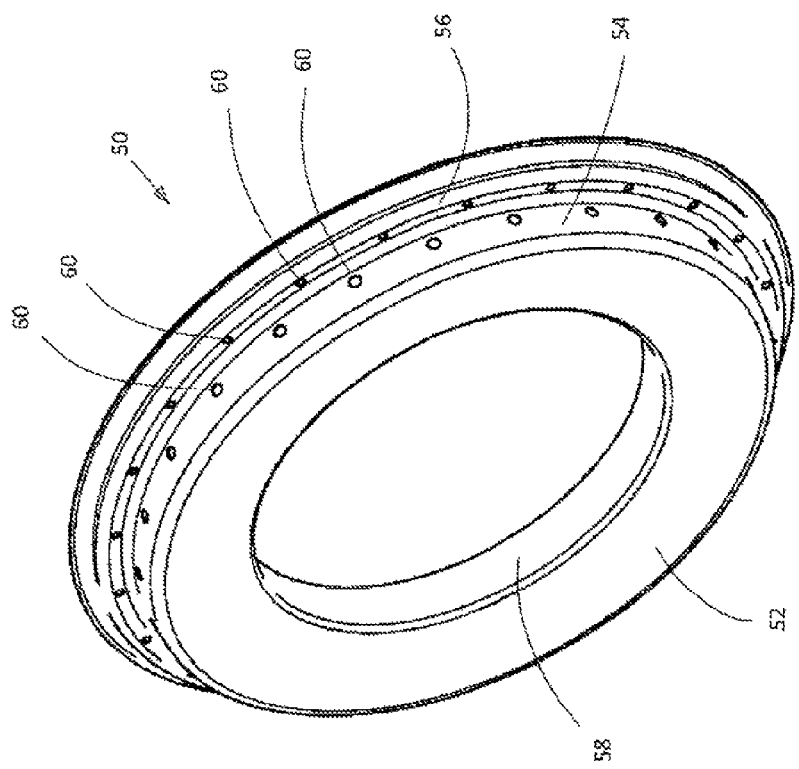
FIG. 4 is a perspective illustration of the shielding device in accordance with a first embodiment.

A perspective illustration of the shielding device 50 can be seen in FIG. 4, which shows the embodiment according to FIG. 2b. In order for residual gases to be able to reach the getter 9 in the evacuated annular space 6, openings 60 in the form of holes are introduced into the segment 54 and also into the segment 56.

Figure 5:
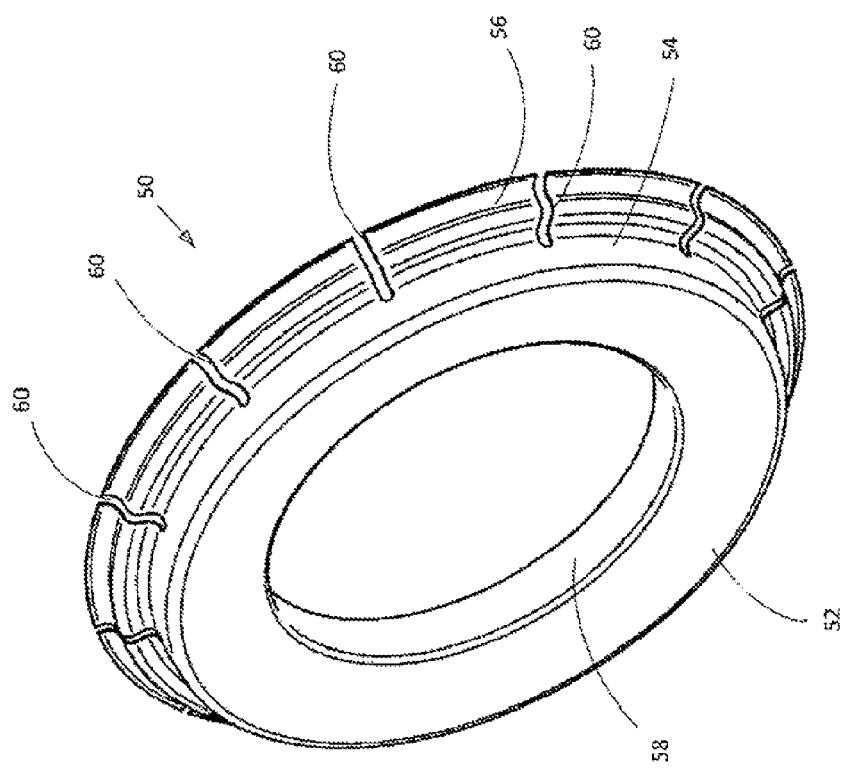
FIG. 5 is a perspective illustration of a shielding device in accordance with another embodiment.

Illustrated in FIG. 5 is another embodiment, which, in place of holes, has openings 60 in the form of radial slits. In the embodiments described, the shielding device 50 is constructed as a one-piece element.

LIST OF REFERENCE SYMBOLS 1 absorber tube
1a, b end of the absorber tube
2 metal tube
4 glass cladding tube
5a, b end of the glass cladding tube
6 inner annular space
7, 7a, c inner annular space segment
7b annular chamber
8 annular space segment
9 getter
10 glass-metal transition element
12 annular step
15 outer annular space
20 expansion compensation device
22 inner end
24 outer end
26 connection segment
30 attachment element
32 annular disc segment
33 radially outward extending fastening segment
34 tubular segment
36 radially inward extending fastening segment
37 ribbing
40 fastening element
50 shielding device
52 first annular disc-shaped segment
53a radially outer-lying edge
53b radially inner-lying edge
54 first tubular segment
56 second annular disc-shaped segment
58 second tubular segment
60 opening
70 outer protective cap
100 connection region of attachment element and expansion compensation device
102 connection point
110 end face
B width of circular ring-shaped front face
L longitudinal axis of the absorber tube
S vertical S1 radiation arrow
S2 radiation arrow
S3 radiation arrow
α tilt angle of the first annular disc-shaped segment

What is claimed is:

1. An absorber tube comprising:
a central metal tube;
a glass cladding tube that surrounds the central metal tube;
a glass-metal transition element arranged at at least one end of the glass cladding tube;
an expansion compensation device connecting the central metal tube and the glass-metal transition element to each other such that the central metal tube and the glass-metal transition element can be displaced relative to each other in a longitudinal direction, the expansion compensation device being arranged at least partially in an annular space between the central metal tube and the glass-metal transition element;
an attachment element joined to the glass-metal transition element, the expansion compensation device having an inner end fastened to the attachment element and an outer end fastened to the central metal tube so that an annular space segment of the annular space is formed between the glass-metal transition element and the attachment element, the attachment element and the expansion compensation device having a circular ring-shaped front face in an axial plan view; and
a shielding device arranged in the annular space, the shielding device having a first annular disc-shaped segment arranged distanced in an axial direction in front of the front face, and the shielding device covering a connection region of the attachment element and the inner end of the expansion compensation device.

2. The absorber tube according to claim 1, wherein the first annular disc-shaped segment is arranged at a tilt by an angle α≥0 with respect to a vertical on a longitudinal axis of the absorber tube.

3. The absorber tube according to claim 2, wherein the first annular disc-shaped segment is arranged at a tilt such that a radially outer-lying edge protrudes axially further into the annular space than does a radially inner-lying edge of the first annular disc-shaped segment.

4. The absorber tube according to claim 2, wherein the angle a lies in a range of 0° to 30°.

5. The absorber tube according to claim 1, wherein the shielding device extends at least partially into the annular space segment.

6. The absorber tube according to claim 1, wherein the first annular disc-shaped segment transitions at its radially outer-lying edge into a first tubular segment, which extends into the annular space segment.

7. The absorber tube according to claim 6, wherein the first tubular segment has a cylindrical or conical construction.

8. The absorber tube according to claim 6, wherein the first tubular segment of the shielding device is arranged at a distance from the attachment element.

9. The absorber tube according to claim 6, wherein the first tubular segment of the shielding device contacts the attachment element.

10. The absorber tube according to claim 1, wherein the shielding device has a second annular disc-shaped segment.

11. The absorber tube according to claim 10, wherein the second annular disc-shaped segment rests against the glass-metal transition element or an annular disc segment of the attachment element.

12. The absorber tube according to claim 10, wherein the glass-metal transition element has an annular step, against which the second annular disc-shaped segment is supported.

13. The absorber tube according to claim 1, wherein the second annular disc-shaped segment separates an annular chamber, which is arranged between the second annular disc-shaped segment and an annular disc-shaped segment of the attachment element, from the annular space segment.

14. The absorber tube according to claim 13, further comprising a getter arranged in the annular space segment.

15. The absorber tube according to claim 1, wherein the first annular disc-shaped segment of the shielding device extends up to an annular space segment between the expansion compensation device and the central metal tube.

16. The absorber tube according to claim 15, wherein the shielding device has a second tubular segment, which extends at least partially into the annular space segment.

17. The absorber tube according to claim 1, wherein the shielding device has openings.

18. The absorber tube according to claim 1, wherein the glass cladding tube has an outer side with an outer protective cap, which covers at least the glass-metal transition element.

* * * * *